US012617519B2

(12) United States Patent  
Prum et al.

(10) Patent No.: US 12,617,519 B2  
(45) Date of Patent: May 5, 2026

(54) AIRSHIP WITH SELF-BALLASTING AIRFRAME

(71) Applicants: David James Prum, Fernandina Beach, FL (US); Gregory Joseph Opas, Fairfax, VA (US)

(72) Inventors: David James Prum, Fernandina Beach, FL (US); Gregory Joseph Opas, Fairfax, VA (US)

( * ) Notice: Subject to any disclaimer, the term of this patent is extended or adjusted under 35 U.S.C. 154(b) by 0 days.

(21) Appl. No.: 18/717,204

(22) PCT Filed: Dec. 7, 2022

(86) PCT No.: PCT/US2022/052089

§ 371 (c)(1),  
(2) Date: Jun. 6, 2024

(87) PCT Pub. No.: WO2023/107534

PCT Pub. Date: Jun. 15, 2023

(65) Prior Publication Data

US 2025/0042531 A1 Feb. 6, 2025

Related U.S. Application Data

(60) Provisional application No. 63/286,733, filed on Dec. 7, 2021.

(51) Int. Cl.  
B64B 1/70 (2006.01)  
B64B 1/06 (2006.01)

(52) U.S. Cl.  
CPC . B64B 1/70 (2013.01); B64B 1/06 (2013.01)

(58) Field of Classification Search  
CPC .................................. B64B 1/70; B64B 1/06  
See application file for complete search history.

(56) References Cited

U.S. PATENT DOCUMENTS

| | | | |
|---|---|---|---|
| 10,494,076 B2 | 12/2019 | Kuhlmann | |
| 2013/0062457 A1* | 3/2013 | Deakin | B64B 1/38 343/706 |
| 2016/0236636 A1* | 8/2016 | Rao | B60R 21/235 |

FOREIGN PATENT DOCUMENTS

| | | |
|---|---|---|
| CN | 112107750 A | 12/2020 |
| GB | 190716967 A | 4/1908 |
| GB | 2417472 B | 10/2009 |

OTHER PUBLICATIONS

Bracher, Joerg, and Manfred Steibli. "The Airboat, a Chance for Environmentally Compatible Transportation." 12th Lighter-Than-Air Systems Technology Conference, 1997, https://doi.org/10.2514/6.1997-1458.

(Continued)

*Primary Examiner* — Valentina Xavier  
(74) *Attorney, Agent, or Firm* — Leber IP Law; Faustino Lichuaco

(57) ABSTRACT

The invention features an apparatus for airborne transport of cargo. Such an apparatus includes a controller and an airship having a hull, an airframe that supports the hull, and at least one ballast chamber. The controller is configured to actively ballast the airship by causing the ballast chamber to contain a variable mass of air. The controller thus controls the mass or weight of air in each ballast chamber. In some embodiments, the ballast chamber's mass is the sum of a fixed mass and a variable mass. The variable mass is that of air that has been pressurized by some variable amount to a pressure above atmospheric pressure. The controller causes the variable mass to change by changing the number of air molecules in the ballast chamber, either by causing that number to increase or decrease.

19 Claims, 2 Drawing Sheets

(56)          References Cited

OTHER PUBLICATIONS

International Search Report and Written Opinion, PCT Application
No. PCT/US2022/052089, mailed Mar. 1, 2023 (8 pages).

\* cited by examiner

AIRSHIP WITH SELF-BALLASTING AIRFRAME

CROSS REFERENCE TO RELATED APPLICATIONS

This application is a national phase under 35 USC 371 of International Application No. PCT/US2022/052089, filed Dec. 7, 2022, which claims priority to and the benefit of the filing date of U.S. Application No. 63/286,733, filed on Dec. 7, 2021, the contents of all of which are hereby incorporated by reference in their entirety.

FIELD OF INVENTION

This invention relates to air transport, and in particular, to lighter-than-air vehicles, also known as "airships."

BACKGROUND

When transporting cargo by air, it is usual to create an upwardly-directed force. Initially, this lifting force is greater than the cargo's weight. This permits upward acceleration until some desired altitude is reached. At some point, the cargo will have been lifted to the desired altitude, as a result, the lifting force must be reduced to an extent that stops upward acceleration but prevents downward acceleration due to gravity. Most of the cargo's voyage will be in this state. Then, as the cargo approaches its destination, it is usual to reduce the lifting force, thereby causing a controlled downward acceleration.

For those aircraft that rely on airfoils to produce lift, it is a simple matter to control the lifting force by controlling forward thrust and angle-of-attack in concert.

For those aircraft that rely on buoyancy, controlling the lifting force is not quite as simple. In such cases, the lifting force depends on the relationship between the density of a gas that is within an airship, the total mass of the airship, and the density of the air that the airship travels through. To control lift, one controls this relationship. Because of difficulties inherent in controlling atmospheric pressure, it is usual to control either the density of the gas within the airship or the total mass of the airship.

SUMMARY

The invention is based on the use of air, the medium through which the airship moves, for controlling the average density of gas within the airship, thereby providing a basis for controlling lifting force.

In one aspect, the invention features an apparatus for airborne transport of cargo. Such an apparatus includes a controller and an airship having a hull, an airframe that supports the hull, and at least one ballast chamber. The controller is configured to actively ballast the airship by causing the ballast chamber to contain a variable mass of air. The controller thus controls the mass or weight of air in each ballast chamber. In some embodiments, the ballast chamber's mass is the sum of a fixed mass and a variable mass. The variable mass is that of air that has been pressurized by some variable amount to a pressure above atmospheric pressure. The controller causes the variable mass to change by changing the number of air molecules in the ballast chamber, either by causing that number to increase or decrease.

Other embodiments include a plenum filled with compressed air and an intake valve that connects the ballast chamber to the plenum. In such embodiments the controller opens the intake valve to increase the ballast chamber's mass.

Still other embodiments include a compressor that draws air from outside the airship, compresses the air, and fills a plenum with compressed air. In such embodiments, the controller causes the ballast chamber to fill with air from the plenum. This increases the ballast chamber's mass.

Also among the embodiments are those that include a bleed valve that controls gas flow between the ballast chamber and air through which the airship travels. In such embodiments, the controller opens the bleed valve to reduce the ballast chamber's mass.

Embodiments also include those in which the ballast chamber includes a bladder that is impermeable to air and a jacket that encloses the bladder to provide radial support to the bladder. Among these are embodiments in which the bladder is made of a gas impermeable material, such as urethane or mylar, and the jacket comprises a woven textile material. Embodiments include those in which the material's fibers comprise polyester aramid or carbon nanotube fibers and yarns.

In other embodiments, the bladder is made of a metal to provide impermeability to gas. A surrounding jacket then provides resistance against rupture. Examples of a suitable metal are light metals such as aluminum.

In still other embodiments, the jacket is made of a material or a combination of materials having a strength-to-weight ratio that is sufficient to enable the bladder to sustain a selected internal pressure while being light enough to permit the airship to attain positive buoyancy.

Still other embodiments are those in which the ballast chamber is a bow ballast chamber and the frame includes a stern ballast chamber that also has a variable mass. Among these are embodiments in which the controller varies masses of the bow and stern ballast chambers to control the airship's pitch.

In some embodiments, the ballast chamber is one of a plurality of ballast chambers. Each of the ballast chambers has a fixed mass and a variable mass, both of which are dependent on the physical dimensions of the ballast chamber. The ballast chamber's fixed mass depends in large part on its surface area. The ballast chamber's variable mass depends on how much air is inside the ballast chamber. This, in turn, depends on the pressure within the ballast chamber. In such embodiments, the controller varies the mass of each of the ballast chambers by monitoring and controlling the pressure within the chamber.

Among these are embodiments in which the ballast chambers include longitudinal and transverse ballast chambers. In some embodiments, the longitudinal ballast chambers comprise tubes that are essentially linear and that extend along the airship's longest axis and the transverse ballast chambers comprise toroidal chambers having centers that intersect the airship's longest axis. In those embodiments that include longitudinal ballast chambers, it is useful to also have a bow sphere and a stern sphere disposed at a bow and stern, respectively, of the airship to provide support for the termination of the overall airframe structure developed by the longitudinal ballast chambers.

In still other embodiments, the ballast chambers are constituents of the airship's airframe.

In another aspect, the invention includes controlling lift of an airship by increasing the mass of pressurized air within a ballast chamber aboard the airship.

Among the practices of the invention are those in which the increase of mass is achieved by admitting compressed air into the ballast chamber.

Other practices include controlling the lift by decreasing the mass of the ballast chamber, for example by causing compressed air in the ballast chamber to be bled out.

Still other practices include determining that a change in lift is required, determining that the change in lift is a positive change, and reducing the mass of the ballast chamber or, in the alternative, determining that the change in lift is a negative change, and increasing the mass of the ballast chamber, for example by filling the ballast chamber with compressed air.

In still other embodiments, the airship comprises an airframe having a mass and increasing the ballast chamber's mass comprises increasing the airframe's mass.

These and other features of the invention will be apparent from the following detailed description and the accompanying figures, in which:

DETAILED DESCRIPTION

Figure 1:
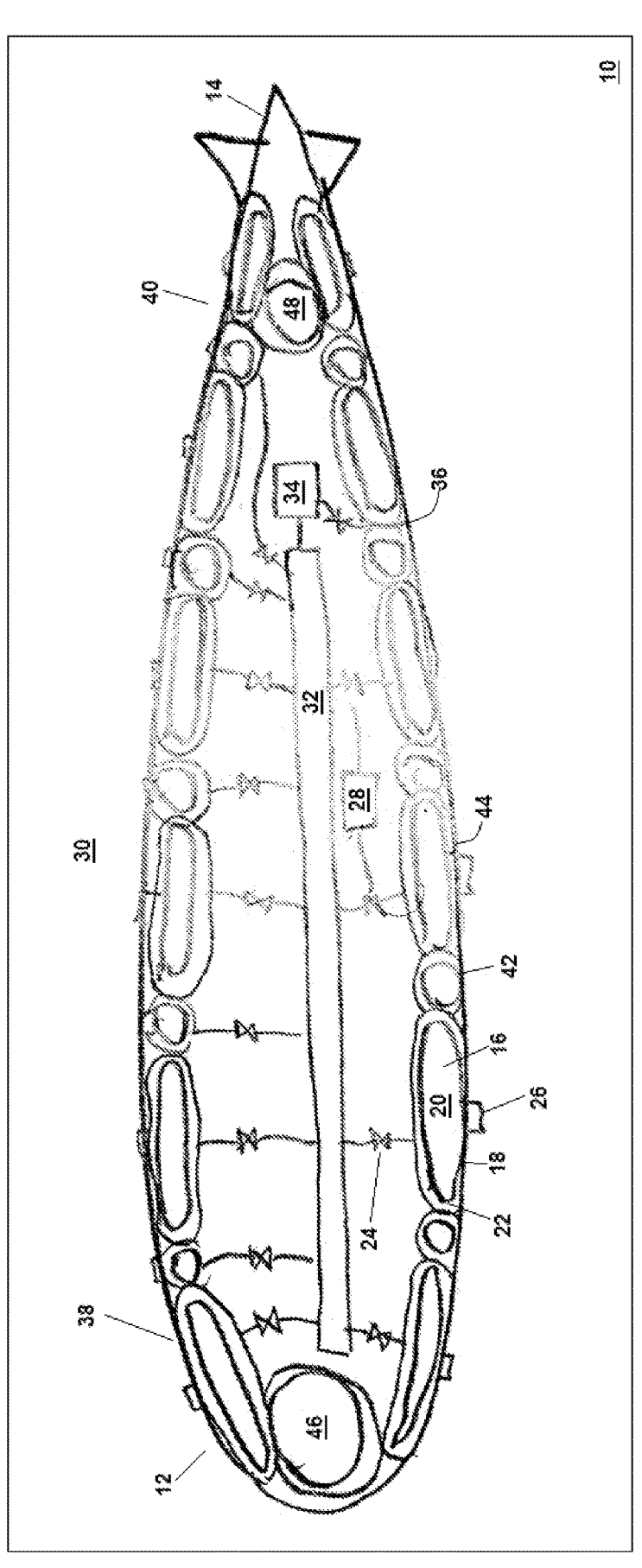
FIG. 1 shows an airship having a ballasting frame comprising ballast chambers and FIG. 2 shows a process carried out by the controller of FIG. 1.

FIG. 1 shows an airship 10 having an airframe 12 that supports a hull 14 and ballast chambers 16 provide variable amounts of ballast for the airship 12. In the illustrated embodiment, the ballast chambers 16 are constituents of the airframe 12. However, in other embodiments, the ballast chambers 16 are separate from the airframe 12.

In either case, each ballast chamber 16 comprises a bladder 18 that defines an air-filled cavity 20. The mass of the ballast chamber 16 is a combination of the mass of its solid fraction and the mass of its gas fraction. The solid fraction comprises the materials from which the ballast chamber 16 is made. This depends in large part on the ballast chamber's surface area. The gas fraction comprises the air that fills the cavity 20. The mass of the gas fraction is therefore a variable mass that depends on the mass of the air that is confined in that ballast chamber's cavity 20.

The ballast chamber's bladder 18 comprises a material that is substantially impermeable to gas. Examples of a suitable material include stretched polyethylene film such as that sold under the tradename MYLAR®.

In some embodiments, a jacket 22 surrounds the ballast chamber's bladder 18. The jacket 22 provides structural support to resist high pressures within the cavity 20. Examples of a suitable material for a jacket 22 include a fabric formed from woven carbon nanotubes and a fabric made of felt or a woven material. In a preferred embodiment, the jacket 22 comprises a material having a strength-to-weight ratio that permits the bladder 18 to sustain a preselected pressure while enabling the airship to attain positive buoyancy.

Each ballast chamber 16 is associated with an intake valve 24 and a bleed valve 26. A controller 28 controls operation of both the intake valve 24 and the bleed valve 26. In doing so, the controller 28 relies on measurements made by various sensors that provide information on pressure within the ballast chambers 16.

The controller 28 opens the bleed valve 26 to the atmosphere 30 to bleed compressed air from the ballast chamber 16 into the atmosphere 30. This reduces the mass of the ballast chamber 16, and in particular, the mass of its gas fraction. The controller 28 closes the bleed valve 26 when the ballast chamber's mass has been sufficiently reduced or when the ballast chamber 16 is to be filled with compressed air.

The controller 28 also opens the intake valve 24, thereby connecting the ballast chamber 16 to a plenum 32 that is common to all the ballast chambers 16 on the airship 10. Prior to opening of the intake valve 24, a compressor 34 draws air from the atmosphere 30 through an air intake 36, compresses the air, and fills the plenum 32 with compressed air. The compressed air then flows through the open intake valve 24 and into the ballast chamber 16, thereby increasing the ballast chamber's mass.

Accordingly, the intake valve 24 and bleed valve 26 provide a way to regulate the ballast chamber's mass, and in particular, the variable mass associated with the ballast chamber's gas fraction. This, in turn, regulates the buoyancy of the airship 10 as a whole. Moreover, in those cases in which the airship 10 is at neutral buoyancy, small perturbations in mass are sufficient to change the sign of the vertical force. Therefore, control over small variations in the ballast chamber's mass by using air as ballast provides a way to regulate the vertical force on the airship 10.

The spatial distribution of the elements of the airframe 12 depends in large part on the airframe's function of supporting the hull 14. In some cases, this spatial distribution may be incompatible with where the ballast chambers 16 should be located. Accordingly, in some embodiments, the ballast chambers 16 are not part of the airframe 12. Such embodiments provide more flexibility in placement of the ballast chambers 16.

In operation, as a cargo-laden airship 10 approaches its destination, intake valves 24 of selected ballast chambers 16 open, thereby increasing the mass of those ballast chambers 16 with compressed air. This increase in mass causes the airship 10 to descend.

During the unloading of cargo, the airship's total mass decreases because cargo is being removed. To offset the airship's tendency to engage in uncontrolled ascent, the compressor 34 further pressurizes the plenum 32, thereby causing additional air to enter the ballast chambers 16, thus increasing their mass. This helps compensate for the loss of mass that results from discharging cargo.

Among the ballast chambers 16 are bow chambers 38 and stern chambers 40. In flight, the controller 28 controls the intake valves 24 and bleed valves 26 of the bow and stern chambers 38, 40 to trim the airship's pitch as required.

In some embodiments, the ballast chambers 16 comprise comprises toroidal chambers 42 and longitudinal chambers 44. In such embodiments, the ballast chambers 16 include an inflated bow sphere 46 and an inflated stern sphere 48 at the airship's bow and stern ends, respectively, which is where the longitudinal members 44 meet at a point. The bow and stern spheres 46, 48 tend to stabilize the airframe 12 by providing radial support to the longitudinal members 44 at those regions at which the longitudinal members are expected to be more heavily loaded. In construction, the bow spheres and stern spheres 46, 48 each comprise a bladder similar to that described in connection with the ballast chambers 16.

Figure 2:
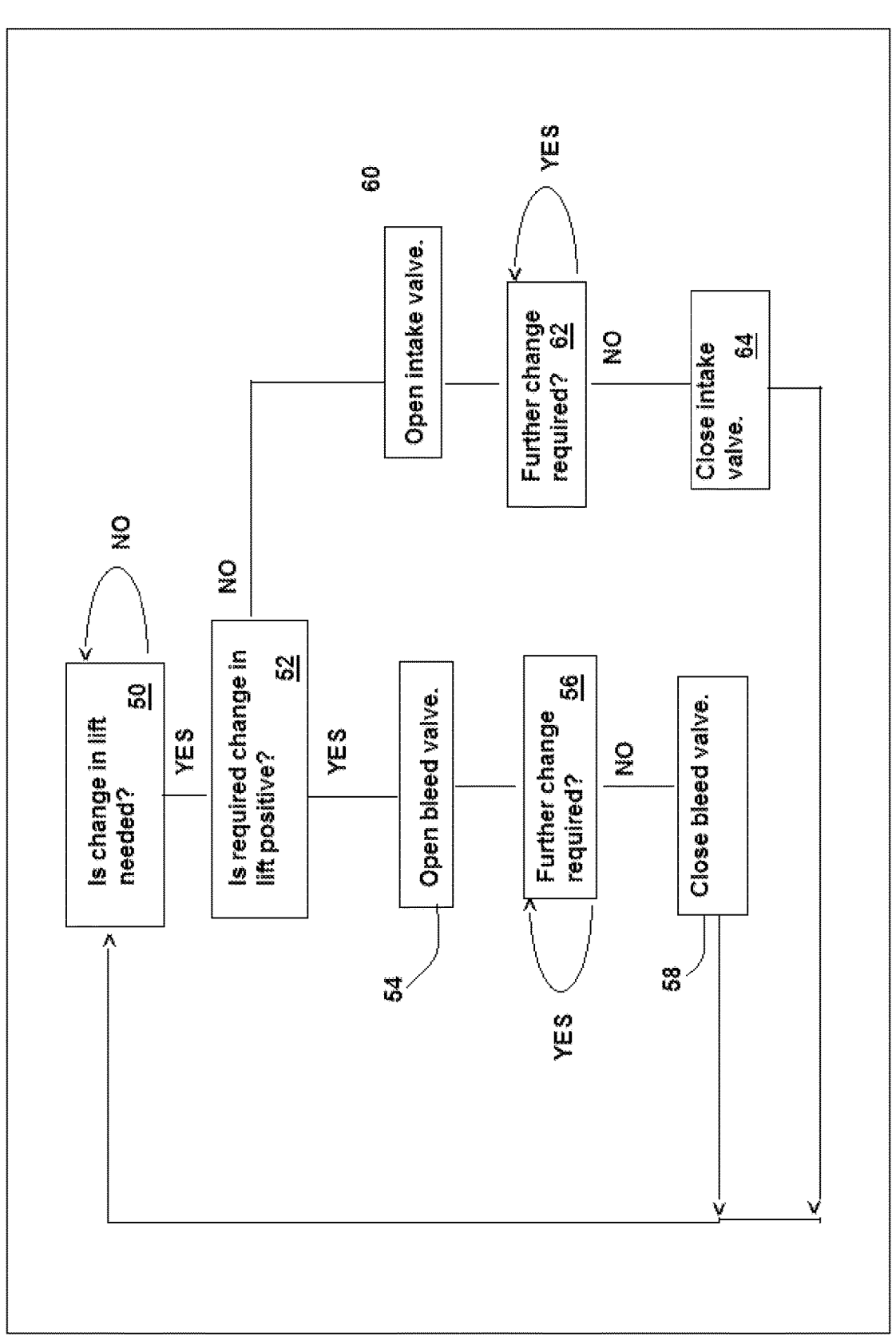

FIG. 2 shows the operation of the controller 28 beginning with the step of determining whether a change in lift is needed (step 50) and if so whether the required change is positive or negative (step 52).

If the controller 28 determines that lift should be increased, it opens the bleed valve 26 (step 54) and, upon determining that the required change has been achieved (step 56) closes the bleed valve 26 (step 58).

Alternatively, upon determining that lift should be decreased, the controller 28 opens the intake valve 24 (step 60) and, upon determining that the required change has been achieved (step 62) closes the intake valve 24 (step 64).

If no change in lift is needed, the controller 28 returns to the step of determining whether a change in lift is needed (step 50).

Having described the invention and a preferred embodiment thereof, what is claimed as new and secured by Letters Patent is:

1. An apparatus for airborne transport of cargo, said apparatus comprising
  a controller,
  an airship having a hull, and
  an airframe, a portion of which supports at least a portion of said hull,
    wherein said airframe comprises a ballast chamber, said ballast chamber having a variable mass, wherein said controller is configured to vary said ballast chamber's mass,
    wherein said ballast chamber is one of a plurality of ballast chambers, each of said ballast chambers having a variable mass, wherein said controller is configured to vary the mass of each of said ballast chambers, and wherein said ballast chambers comprise longitudinal ballast chambers that extend along an axis of said airship and toroidal ballast chambers having centers that intersect said axis,
    wherein each of said ballast chambers comprises a bladder that is impermeable to air and a jacket that encloses said bladder to provide radial support to said bladder.

2. The apparatus of claim 1, wherein said ballast chamber's mass comprises a fixed mass and a variable mass, wherein said variable mass comprises compressed air, and wherein said controller is configured to change said variable mass by causing a change in pressure of said compressed air.

3. The apparatus of claim 1, further comprising a plenum filled with compressed air and an intake valve that connects said ballast chamber to said plenum, wherein said controller is configured to open said intake valve to increase said ballast chamber's mass.

4. The apparatus of claim 1, further comprising a compressor that draws air from outside said airship, compresses said air, and fills a plenum with compressed air, wherein said controller causes said ballast chamber to fill with air from said plenum, thereby increasing said ballast chamber's mass.

5. The apparatus of claim 1, further comprising a bleed valve that controls gas flow between said ballast chamber and air through which said airship travels, wherein said controller is configured to open said bleed valve to reduce said ballast chamber's mass.

6. The apparatus of claim 1, wherein said ballast chamber comprises a bladder made of a urethane and a jacket that encloses said bladder, said jacket comprising polyester.

7. The apparatus of claim 1, wherein said airship comprises a bow and a stern, wherein said ballast chamber is a bow ballast chamber, wherein said bow ballast chamber is located at said bow of said airship, wherein said plurality of ballast chambers further comprises a stern ballast chamber having a variable mass, wherein said stern ballast chamber is located at said stern of said airship, and wherein said controller is configured to vary masses of said bow and stern ballast chambers to control pitch of said airship.

8. The apparatus of claim 1, wherein each of said ballast chambers comprises a variable mass and wherein said controller is configured to vary the mass of each of said ballast chambers.

9. The apparatus of claim 1, wherein said ballast chamber comprises a gas-impermeable bladder and a jacket that encloses said gas-impermeable bladder to provide radial support to the bladder.

10. The apparatus of claim 1, wherein said airship further comprises a bow sphere and a stern sphere disposed at a bow and stern, respectively, of said airship, and wherein said bow sphere and said stern sphere provide support for said longitudinal ballast chambers of said frame.

11. The apparatus of claim 1, wherein said ballast chamber comprises a metal bladder and a jacket that surrounds said bladder and provides resistance against rupture thereof.

12. A method comprising controlling lift of an airship having an airframe having a portion that supports at least a portion of a hull thereof, wherein said ballast chamber is one of a plurality of ballast chambers, each of said ballast chambers having a variable mass, wherein said controller is configured to vary the mass of each of said ballast chambers, and wherein said ballast chambers comprise longitudinal ballast chambers that extend along an axis of said airship and toroidal ballast chambers having centers that intersect said axis, wherein each of said ballast chambers comprises a bladder that is impermeable to air and a jacket that encloses said bladder to provide radial support to said bladder, wherein controlling said lift comprises increasing a mass of a ballast chamber aboard said airship.

13. The method of claim 12, wherein increasing said mass comprises admitting compressed air into said ballast chamber.

14. The method of claim 12, wherein controlling said lift further comprises decreasing said mass of said ballast chamber.

15. The method of claim 12, wherein controlling said lift further comprises causing compressed air in said ballast chamber to be bled out.

16. The method of claim 12, wherein controlling said lift comprises determining that a change in lift is required, determining that said change in lift is a positive change, and reducing said mass of said ballast chamber.

17. The method of claim 13, wherein controlling said lift comprises determining that a change in lift is required, determining that said change in lift is a negative change, and increasing said mass of said ballast chamber.

18. The method of claim 12, wherein increasing said mass of said airframe comprising filling a ballast chamber in said airframe with compressed air.

19. The method of claim 12, wherein said airframe has a mass and wherein increasing said mass of said ballast chamber comprises increasing said airframe's mass.

\* \* \* \* \*